United States Patent [19]
Hashimoto et al.

[11] Patent Number: 4,789,293
[45] Date of Patent: Dec. 6, 1988

[54] AUTOMATIC RENTAL SAFE-DEPOSIT BOX SYSTEM

[75] Inventors: Junji Hashimoto; Harumi Murata; Hiroshi Nishio, all of Osaka, Japan

[73] Assignee: Itoki Co., Ltd., Osaka, Japan

[21] Appl. No.: 879,531

[22] Filed: Jun. 23, 1986

Related U.S. Application Data

[63] Continuation of Ser. No. 563,806, Dec. 21, 1983, abandoned.

[51] Int. Cl.⁴ .............................................. B65G 1/00
[52] U.S. Cl. .................................. 414/273; 186/37; 198/950; 414/281; 414/285; 364/478
[58] Field of Search .............. 414/273, 277, 281, 285; 186/37, 55, 56; 109/1 R, 21, 38; 104/39; 198/950; 364/478; 235/379, 381, 382, 383

[56] References Cited

U.S. PATENT DOCUMENTS

| | | | |
|---|---|---|---|
| 3,442,403 | 5/1969 | Weir | 414/285 X |
| 3,473,675 | 10/1969 | Goldammer et al. | 414/273 |
| 3,964,577 | 6/1976 | Bengtsson | 414/281 X |
| 4,225,278 | 9/1980 | Weiner | 414/281 X |
| 4,497,254 | 2/1985 | Schmidt | 198/950 X |

FOREIGN PATENT DOCUMENTS

| | | | |
|---|---|---|---|
| 1128326 | 4/1962 | Fed. Rep. of Germany | 109/21 |
| 2526474 | 11/1983 | France | 109/38 |
| 209101 | 12/1982 | Japan. | |
| 209383 | 12/1982 | Japan. | |
| 616207 | 7/1978 | U.S.S.R. | 198/950 |

Primary Examiner—Robert J. Spar
Assistant Examiner—Stuart J. Millman
Attorney, Agent, or Firm—Hopgood, Calimafde, Kalil, Blaustein & Judlowe

[57] ABSTRACT

A system wherein a contractor of a rental safe-deposit box can privately obtain, handle and restore his own box in the fire-proof safe room. The system includes an automatic article retrieval and storage unit located within the safe room and having contractors' safe-deposit boxes. A plurality of private compartments for contractors' use are disposed separately from the safe room and are connected to the retrieval and storage unit by conveyor devices extending through a safe room wall opening having a fire-proof door. Each private room includes a data input terminal device and a handling table. When a contractor operates the terminal device to input his identification code, his own rental safe-deposit box is automatically extracted onto the handling table from the safe room.

6 Claims, 4 Drawing Sheets

AUTOMATIC RENTAL SAFE-DEPOSIT BOX SYSTEM

This application is a continuation, of application Ser. No. 563,806, filed Dec. 21, 1983, now abandoned.

BACKGROUND OF THE INVENTION

This invention relates to automated systems for storing and retrieving containers. More specifically, the present invention relates to such systems wherein a particular container can be selectively stored and retrieved from an isolated storage chamber such as a refrigerated or fire proof room.

In many storage systems wherein a lot of articles or containers having articles are stored in an isolated room, or chamber, for example, a tightly sealed room such as a refrigerating room, a thermostically controlled room, a fire-proof room, a safe room or the like, and a secret room for storing secret or important articles, it is often desired that a desired article or container can be retrieved from the room and again stored therein automatically.

It is undesirable that a person goes in and out of such a tightly sealed room for storing and retrieving articles, because the internal condition such as temperature, pressure, cleanliness or others is changed thereby. In some instances anyone wishing to enter such a room must put on a special or exclusive apparel such as a suit, jacket or the like. This is inconvenient for the person. In another case, a man who goes in the room may be in danger.

In connection with secret room storing secret articles, it is undesired for protection of secrecy that a person or persons can go in the room every time when desiring a stored article or articles.

In rental safe deposit box system, those boxes are stored in a fire-proof safe room in a bank. When a hirer or a contractor desires to use his box, he must usually ask to a clerk to bring his box. However, it is desired for protecting privacy of the contractor that he can perform retrieval and return of his box without handle and observation by other persons.

SUMMARY OF THE INVENTION

It is an object of this invention to provide a system wherein a lot of articles are stored in an isolated room having a tightly closed opening by a door and a desired one of the articles can automatically be retrieved to a location separated from the room through the opening and again stored into the room automatically.

It is another object of this invention to provide the system wherein all data in connection with every retrievals can be recorded.

It is still another object of this invention to provide the system wherein only predetermined persons permitted can perform retrieval of articles stored in the room.

It is yet another object of this invention to provide the system wherein each one of the predetermined persons can retrieve predetermined one of the articles stored in the room but cannot obtain the other articles than the predetermined one.

It is a special object of this invention to provide an automatic rental safe-deposit box system wherein a lot of safe-deposit boxes are stored in a fire-proof safe room having a fire-proof door in a bank and anyone of hirers or contractors can automatically retrieve his own box in a private room separated from the safe room, can handle the box in the private room and can again store the box into the safe room automatically, without intermediation of other persons nor observed by others.

According to an aspect of this invention, a system for automatically retrieving articles from, and storing the articles into, an isolated room, can be obtained. The system comprises an automatic article retrieval and storage unit constructed in the isolated room, the unit comprising article storing shelf means having a plurality of article storage locations arranged in a matrix-like form, an article delivery and return station provided at an end of the shelf means, a transporting platform means being disposed to be movable along a front surface of the shelf means and transporting an article from one of the article delivery and return station and a selected one of the article storage locations, an article delivering means being mounted on the platform means and for effecting the article delivery from one of the platform means and the article storage location selected to the other and from one of the platform means and the delivery and return station to the other. An opening is formed in a wall defining the isolated room and for permitting articles to pass therethrough. A door means is provided to automatically close and open the wall opening. Internal transporting means is provided for transporting articles between the article delivery and return station and the wall opening. At least one article handling table is disposed outside the isolated room. External transporting means is provided for transporting articles between the wall opening and the at least one article handling means. A movable portion of one of the internal and external transporting means is made to be automatically moved apart from the wall opening at a time when the door means is closed, while being moved to the wall opening at another time when the door means is opened. Data input terminal means is provided at the at least one article handling table for inputting information data in connection with article retrieval or storage and an article storing location. Electric control means is connected to the data input terminal means and controls operations of the automatic article retrieval and storage unit, the internal and external transporting means, the automatically opening and closing door means, and the movable portion.

According to another aspect of this invention, an automatic rental safe-deposit box system for automatically retrieving a rental safe-deposit box belonging to a user as requested by the user from a safe room storing a lot of boxes belonging to respective users, can be obtained. The system comprises an automatic box retrieval and storage unit constructed in said safe room, the unit comprising box storing shelf means having a plurality of box storage locations arranged in a matrix-like form, a box delivery and return station provided at an end of the shelf means, a transporting platform means being disposed to be movable along a front surface of the shelf means and transporting a box from one of the box delivery and return station and a selected one of the box storage locations, a box delivering means being mounted on the platform means and for effecting the body delivery from one of the platform means and the article box storage location selected to the other and from one of the platform means and the delivery and return station to the other. An opening is formed in a fire-proof wall containing the safe room for permitting boxes to pass therethrough. A plurality of private compartments are disposed separately from the safe room, each for permitting each user to privately handle his own rental box therein. Data input terminal means is disposed within each compartment and permits a user to input information data required for retrieving his own rental box and to input a storage command after his use of the rental box. Transporting means comprise a single main transporting means extending from the box delivery and return station to vicinities of the plurality of private compartments through the wall opening, and a plurality of sub-transporting means connecting the single main transporting means and respective private compartments. The transporting means are for transporting a rental box from one of the box delivery and return station and a selected one of the plurality of private compartments. Box displacing means are provided at cross positions between the single main transporting means and respective sub-transporting means, and displace a box on the single main transporting means to one of the sub-transporting means corresponding to the selected one of the private compartments. Electric control means is connected to the data input terminal means and controls operations of the automatic box retrieval and storage unit, the transporting means and the box displacing means, whereby a user can automatically obtain, and again store, his own rental box only by operating the data input terminal within one of the private compartment.

DETAILED DESCRIPTION OF PREFERRED EMBODIMENTS

An embodiment of this invention will be described in connection with an automatic rental safe-deposit box system with reference to the drawings.

Figure 1:
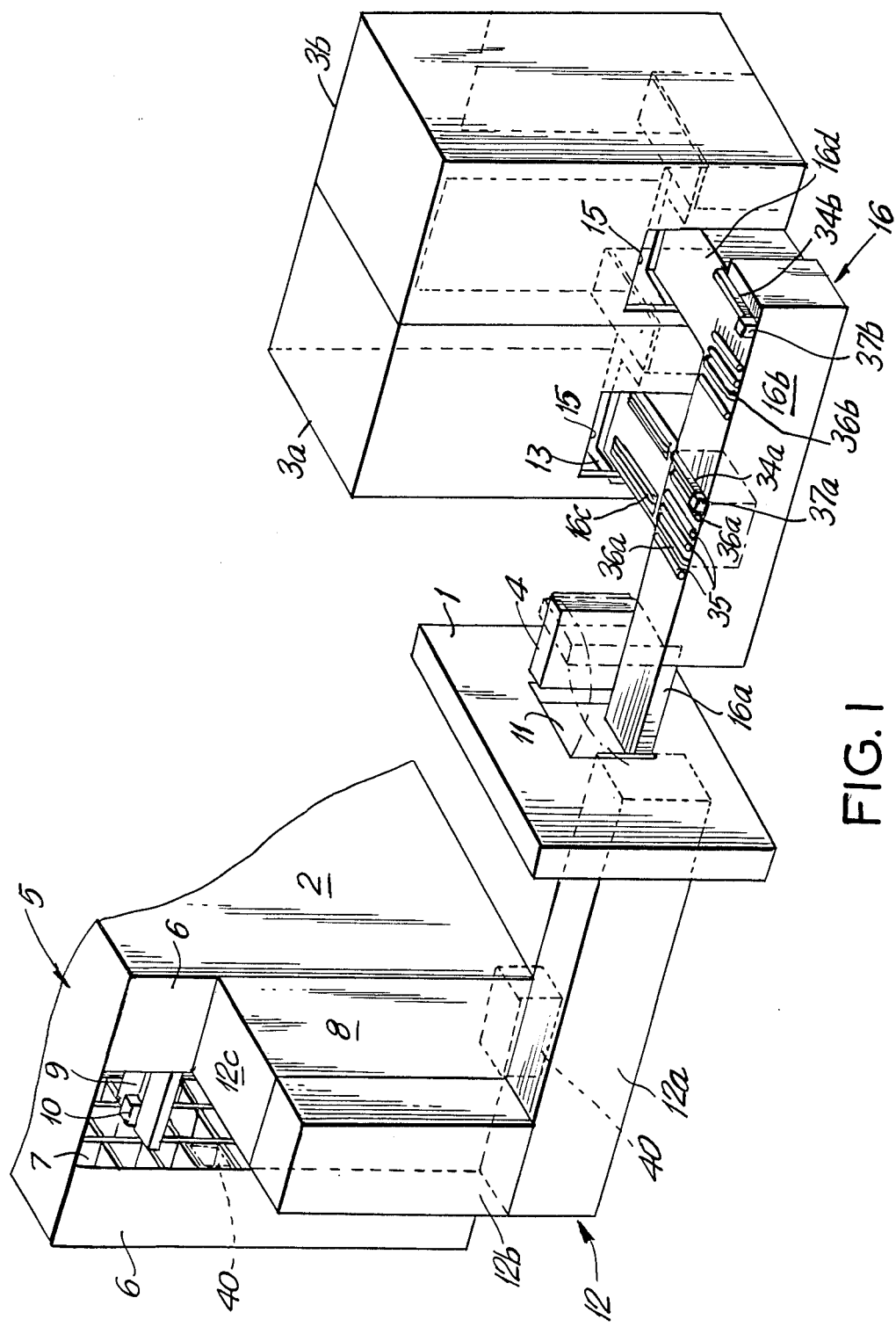
FIG. 1 is a rear perspective view schematically illustrating a construction of an embodiment of this invention.
Figure 2:
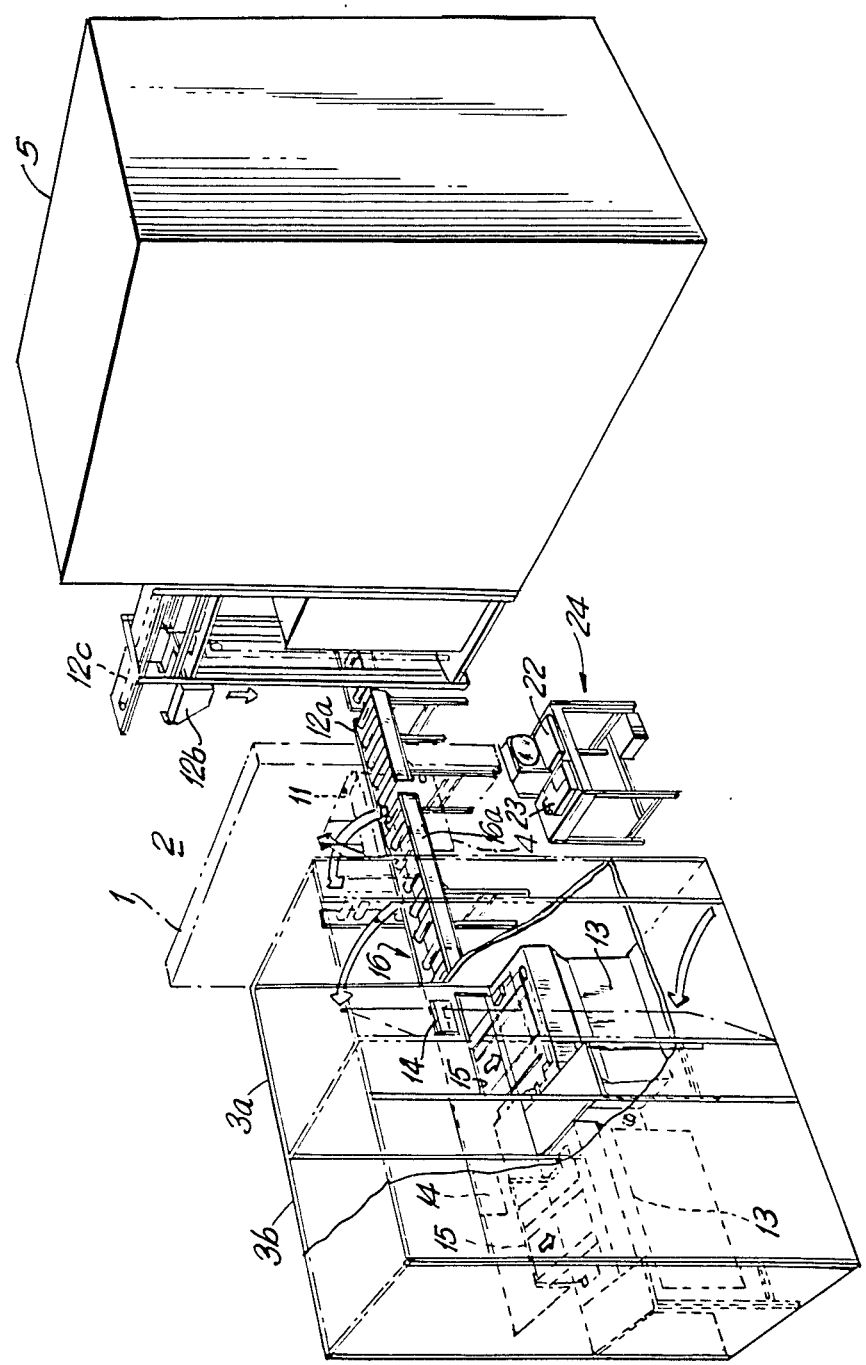
FIG. 2 is a front perspective view schematically illustrating the embodiment.

Referring to FIGS. 1 and 2, the system shown therein comprises a safe room 2 for storing rental safe-deposit boxes therein and being enclosed by a wall 1 (only a portion thereof is shown) such as a fire-proof or refractory wall, and a plurality of private rooms (two rooms 3a and 3b are shown) for clients' or hirers' privately handling their own safe-deposit boxes and being located apart from safe room 2. The safe room 2 is provided with a fire-proof door 4 in the wall 1 for permitting the safe-deposit boxes to pass therethrough.

Within safe room 2, an automatic box storage and retrieval unit 5 for storing the safe-deposit boxes at predetermined locations in a shelf or a rack is established wherein a desired one of the stored boxes can be automatically taken out of the unit and automatically returned to the predetermined location in the shelf. Well-known automatic object storage and retrieval apparatus, as described in U.S. Pat. No. 3,526,326 and others, are conventionally used for such an automatic box storage and retrieval unit. Namely, this unit is provided with storage shelves 6 (confronting two shelves are shown) each of which has a plurality of box storing locations 7 arranged into a matrix-like form, a transportation platform 9 which conveys a box between each storing location 7 and a delivery and return station 8 provided to one end of the confronting storage shelves, a box gripping means 10 used for transferring a box between transportation platform 9 and a storing location 7 or delivery and return station 8, and a control circuit (not shown in the drawings).

When the control circuit receives a code indicating a storing location of a box to be retrieved and a take-out command, transportation platform 9 moves and reaches the inputted receiving location, and box gripping means 10 is actuated to take out the storage box onto transportation platform 9. Then, platform 9 moves to delivery and return station 8, where gripping means 10 is again actuated to transfer the box to the station 8.

For return and storage actions, a code indicating the storing location of the box to be returned and a return command are inputted to the control circuit. Then, transportation platform 9 moves to delivery and return station 8, and gripping means 10 transfers the box onto transportation platform 8, which, in turn, moves to the storing location inputted. Then, gripping means 10 is actuated to transfer the box onto the corresponding storing location.

The detailed construction and the functions of the automatic box storage and retrieved units are well-known in the prior art, and therefore, are not described further.

In safe room 2, there is a transporting device 12 connecting the safe room entrance 11 closed by door 4 with delivery and return station 8. In the embodiment shown, the transporting device 12 comprises a horizontal conveyor 12a, an elevator 12b vertically connecting the delivery and return station 8 with one end of horizontal conveyor 12a, and another conveyor 12c feeding a box into elevator 12b from delivery and return station 8.

Each private room of 3a and 3b is provided with a handling table 13, and an operating console containing keyboards for inputting information such as a number or a storing location code of a box desired, the retrieved or storage command, etc., a card reading device for an ID card, and displays, within the room. The back wall of each private room of 3a and 3b is provided with a box passing gate 15. A transporting device 16 extends through gate 15 to connect safe room entrance 11 with the handling table 13. The transporting device 16 comprises a movable conveyor 16a which moves away from entrance 11 when door 4 is closed and approaches it when door 4 is opened so as to be connected with inside conveyor 12a, and a main conveyor 16b connected with movable conveyor 16a, and sub-conveyors 16c and 16d which are branched from the main conveyor 16b and extended to handling tables 13 of respective rooms 3a and 3b through respective gates 15. The movable conveyor 16a is shown in the embodiment as a swing-up type conveyor, namely, pivoted to be rotatable up and down at one end of the main conveyor 16b and driven by a motor (not shown).

Now referring to FIG. 3, a control circuit of the system will be described. In the figure, consoles 14 of respective private rooms 3a and 3b are connected to a main control device 17, which generates control signals to control operations of storage and retrieval unit 5, door 4, and transporting devices 12 and 16 in response to information inputted from each console 14. Moreover, a control circuit 18 of storage and retrieval unit 5, a control circuit 19 of door 4, and a control circuit 20 of transporting devices 12 and 16 are connected to main control device 17.

The main control device 17 is also provided with a memory device 21 which stores recognition codes representing respective users or contractors recorded on ID cards delivered to them, recitation numbers or private numbers of the contractors, and box storing addresses in the storage and retrieval unit.

On the other hand, the main control device 17 is connected with a service input device 22 and a recording device 25 which are positioned on a control table 24. The service input device 22 commands input or placement of the recognition codes and the recitation numbers into memory device 21, and controls establishment of the initial state and stop of the system at start and termination of daily service, respectively. The recording device 23 records service data of the system such as the service date (year, month, day and hour), retrieval storage history of the boxes, and the like.

For starting the safe-box service, predetermined items such as date, hour, operator code and the recognition code assigned to the operator are inputted via the service input device 22. This information is sent to main control device 17, and if there is no discrepancy with the contents in memory device 21, main control device 17 sends command signals for setting control circuits 18, 19 and 20 into their initial states, respectively.

When receiving the initial state setting signal, the control circuit 18 of the automatic storage and retrieval unit 5 controls respective driving parts (as represented by 25) of the transportation platform 9 and the gripping means 10 in such a way that they can be moved to their predetermined initial positions, respectively, and then sends a termination signal of the initial state setting to main control device 17.

On the other hand, the door control circuit 19 actuates a driving motor 26 to open door 4 in response to the initial state setting signal. After opening door 4, the door control circuit 19 sends a door-open signal to main control device 17.

When receiving the door-open signal, main control device 17 sends a signal (a connecting signal) for commanding movement of movable conveyor 16a to entrance 11, as the initial state setting signal, to the control circuit 20 of the transporting device. Accordingly, motor 27 is driven and movable conveyor 16a moves to entrance 11, whereby the inside and outside conveyors 12a and 16b are connected to one another through the movable conveyor 16a. When this operation is completed, a complete signal is sent from the conveyor control circuit 20 to main control device 17.

When receiving both of the complete signal and the above-mentioned signal from the unit control circuit 18, main control device 17 activates an indicator on service input device 22 to display completion of the initial state setting, and at the same time, activates recording device 23 to record the inputted data on a predetermined format. Thus, the system is put in the waiting condition for a requirement of safe-deposit box retrieval.

After starting the service, a hirer, who visits to use his box, enters a vacant one of the private rooms 3a and 3b. For example, in private room 3a, the user inserts his ID card into card reading device 28 (FIG. 3) on console 14, and inputs his recitation number by keyboard 30 (FIG. 3) checking indicator 29 (FIG. 3). The main control device 17 compares a combination of the information signals from reading device 28 and from keyboard 30 with the content of memory device 21. If there is no coincidence between the combination and the memory content, the main control device 17 commands indicator 29 to display an invalid access for a certain time period and stops the proceeding operations. If they coincide with one another, main control device 17 commands indicator 29 to display the transport operation start and at the same time sends a code representing the storing location of the box belonging to the user and a retrieval command to control circuit 18 of the unit 5. Upon receiving the retrieval command signal and the storing location code, the unit control circuit 18 controls the respective driving parts 25 of transportation platform 9 and gripping means 10 in such a way that the take-out operation of the required box onto delivery and return station 8 is performed, after which a take-out complete signal is sent to main control device 17.

The main control device 17, then, generates a command signal to conveyor control circuit 20 to begin transport operation. The control circuit 20 starts and controls operation of the transporting devices 12 and 16, namely, puts a driving motor 31 (FIG. 3) of conveyor 12c on delivery and return station 8 in motion to feed the box to the elevator 12b, makes elevator 12b descend by a driving motor 32 (FIG. 3) so as to place the box on the horizontal conveyor 12a, puts the respective driving motors (represented as 33) of horizontal conveyor 12a, movable conveyor 16a, main conveyor 16b, and sub-conveyors 16c in motion to feed box 40 onto handling table 13 in the private room 3a. When these operations are completed, a transport complete signal is sent to main control device 17 from the control circuit 20.

The main control device 17, then, commands the retrieval operations of a box requested from a different private room 3b, or storage operation (described later) thereof, if there is such a request.

In the system, as there are multiple private rooms (two in this embodiment), a stopper plate that moves up and down, an object detecting means, and object displacing means are located at each of the crossing points between the main conveyor and the respective sub-conveyors, so that the object can be displaced on a sub-conveyor corresponding to a requesting private room. Namely, each crossing point is provided with a stopper plate 34 which projects over the main conveyor part 16b in order to stop transportation of the object moving in the direction of the main conveyor part 16b, and a belt conveyor 36 which runs in a direction perpendicular to the conveyor roller of the main conveyor part and elevated from below over the conveyor roller surface, as shown at the crossing point between main conveyor 16b and sub-conveyor 16c in FIG. 1, and further provided with a detector 37 (for example, a microswitch, a photoelectric switch, etc.) for detecting the presence of the object thereon, as also shown at the crossing point between the main conveyor part 16b and the subconveyor part 16d. The ones 34, 36 and 37 located at the crossing point with the sub-conveyor part 16c corresponding to the private room 3a are designated with suffix "A", while those to the private room 3b with suffix "B".

The up and down motion of stopper plate 34 and the up and down motion and transport operation of the belt conveyor 36 are carried out under control of main control device 17. The output of the detector 37 is also connected with main control device 17 and used for controlling belt conveyor 36. Namely, referring to FIG. 3, if a retrieval is demanded from private room 3a, in addition to the retrieval operation as mentioned above, a driving motor 38a for stopper plate 34a at the crossing point between sub-conveyor 16c corresponding to said private room 3a and main conveyor part 16b is driven to elevate the stopper plate 34a. Thereafter, when there is a detection output of detector 37a, an up and down motion motor and a driving motor for transportation of belt conveyor 36a (both are represented as 39a) are activated by main control device 17 to elevate the belt conveyor 36a and start the transporting action. Thereby, the box located at the crossing point is displaced from main conveyor 16b to sub-conveyor 16c and sent out on handling table 13 in the requesting private room 3a through sub-conveyor part 16c. When the transporting action is finished, the motors 38a and 39a are driven in reverse to lower stopper plate 34a and the belt conveyor 36a. When retrieval is requested from another private room 3b, another stopper plate 34b and another belt conveyor 36b at the crossing point with sub-conveyor 16d are driven similarly. These driving motors are shown at 38b and 39b in FIG. 3.

For storing the box retrieval, the storing action is initiated by operation of the keyboard 30 in, for example, private room 3a to input the return command signal and, if necessary, the storing code.

Receiving the code and the return command, and the storing code if inputted, from the console 14, main control device 17 sends a return-operation command signal to conveyor control circuit 20. Namely, the conveyor control circuit 20 actuates elevator driving motor 32 to lower elevator 12b, and also rotates the respective driving motors 33 of sub-conveyor 16c, main conveyor 16b, the movable conveyor 16a, and horizontal conveyor 12a in order to feed the box from the handling table 13 onto the descended elevator 12b. Then, elevator driving motor 32 is driven to elevate elevator 12b. When the elevator 12b arrives at delivery and return station 8, driving motor 31 of conveyor 12c is driven to take out the box from the inside of elevator 12b and place it on the station 8. The conveyor control circuit 20 then sends a signal to main control device 17, which transmits the storing location code and the storage command signal to the unit control circuit 18. Then, the control circuit 18 actuates driving motors 25, etc. to start the storage action of transportation platform 9 and gripping means 10, so that the box on the delivery and return station 8 can be returned to the storing location on the shelf designated by the storing code. When the return action is completed, unit control circuit 18 sends a signal to main control device 17, whereby the system is in a condition awaiting a new request from a private room, or starts the operation already requested from a private room.

At the end of a day's service, the person in charge inputs the information necessary to stop the service operation of the system from the service input device in the similar manner as in the service start. If there is no abnormality in the information inputted, main control device 17 sends a recovery signal to conveyor control circuit 20, which thereupon rotates motor 27 reversely to turn movable conveyor 16a upwards. When the upward motion of the conveyor 16a is completed, a conveyor motion complete signal is sent to main control device 17, which, in turn, sends a door closing signal to door control circuit 19 to drive motor 26 reversely in order to close door 4. When door 4 is closed, a door closed signal is sent to main control device 17 and the system stops.

Figure 4:
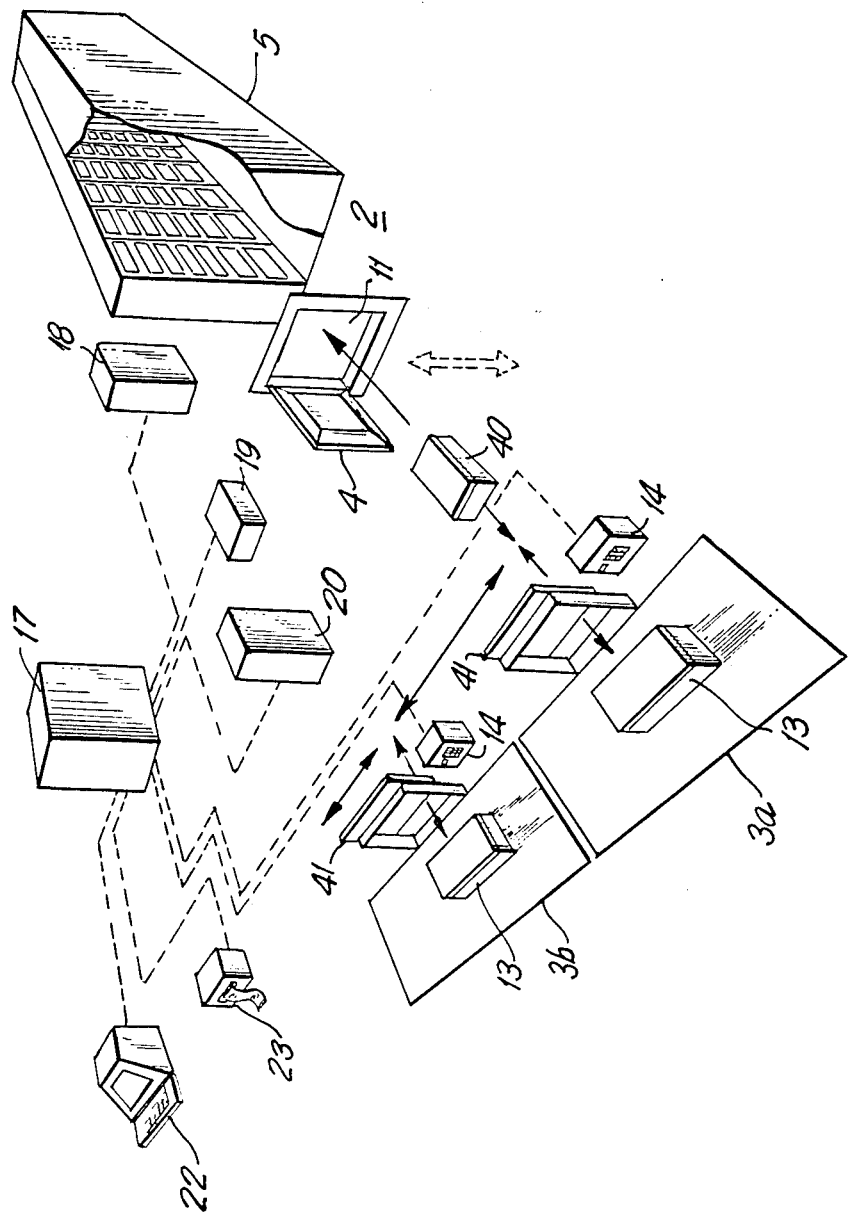
FIG. 4 is a perspective view illustrating an example of the system layout.

FIG. 4 is a perspective view showing an outline of the system layout, wherein various paths of safe-deposit boxes, such as box 40, are designated by thick solid arrows, while signals by broken lines.

In the above embodiment, gate 15 to each private room 3 is maintained open. However, it is preferable to use a refractory door (represented at 41 in FIG. 4), such as an iron door, which is mounted at gate 15 to be slidable upwards and downwards and to open only for passing the box therethrough. A motor can be installed for this purpose. The motor is activated by an output of a detector, such as a microswitch, for detecting the transportation of a box onto, for example, sub-conveyor 16c corresponding to private room 3a, and thus, door 41 is opened. Then, when the box is displaced onto handling table 13, door 14 is closed by the transport complete signal as described above. For returning the storage box, the motor is activated by the above-described return command to open door 41, and is driven reversely by the aforementioned detector output when the box is transferred from handling table 13 onto sub-conveyor 16c. All of these door motions may be controlled by main control device 17.

As clearly understood from the above description, a construction space and expenditures for transportation of boxes are saved, because the traverse motion of a single transportation line (excluding the sub-conveyors) between the storage unit 5 and each private room 3 can serve for all take-out and take-in actions of boxes.

Meanwhile, when the inputs from multiple private rooms interferes, the priority is given to the earlier input, while the main control device 17 holds the later input until the preceding actions are finished. For the storage commands, however, main control device 17 can be made to carry out displacement of the box onto sub-conveyor 16c or 16d, independently of inputs from other private rooms, and keeps the box in waiting on the sub-conveyor until the actions corresponding to the earlier input are finished, thereby preventing the client requesting the storage from waiting for a long and uncomfortable period.

The above-mentioned embodiments are directed to an automatic rental safe-deposit box system wherein the boxes stored in the storage unit belong to predetermined users. Therefore, the storing location codes of respective users' boxes are stored in the memory together with information representing respective users. Accordingly, anyone of users can access his own boxes by setting his ID card and inputting his recitation number at the consoles without inputting the storing location codes of his box, but he cannot obtain other boxes' than one belonging to him. Accordingly, the system of the above-mentioned embodiments cannot be applied to a system wherein articles can be automatically retrieved and stored as desired in an isolated chamber such as a fireproof room, a refrigerating room, a thermostat room, a secret room or the like. However, it will be easily understood by those skilled in the art from the description of the above-described embodiments that the system shown in FIGS. 1–4 would be used to such an application by modifying the control circuit of the system. In that case, an isolated room is represented by room 1 in FIGS. 1 and 2.

Figure 3:
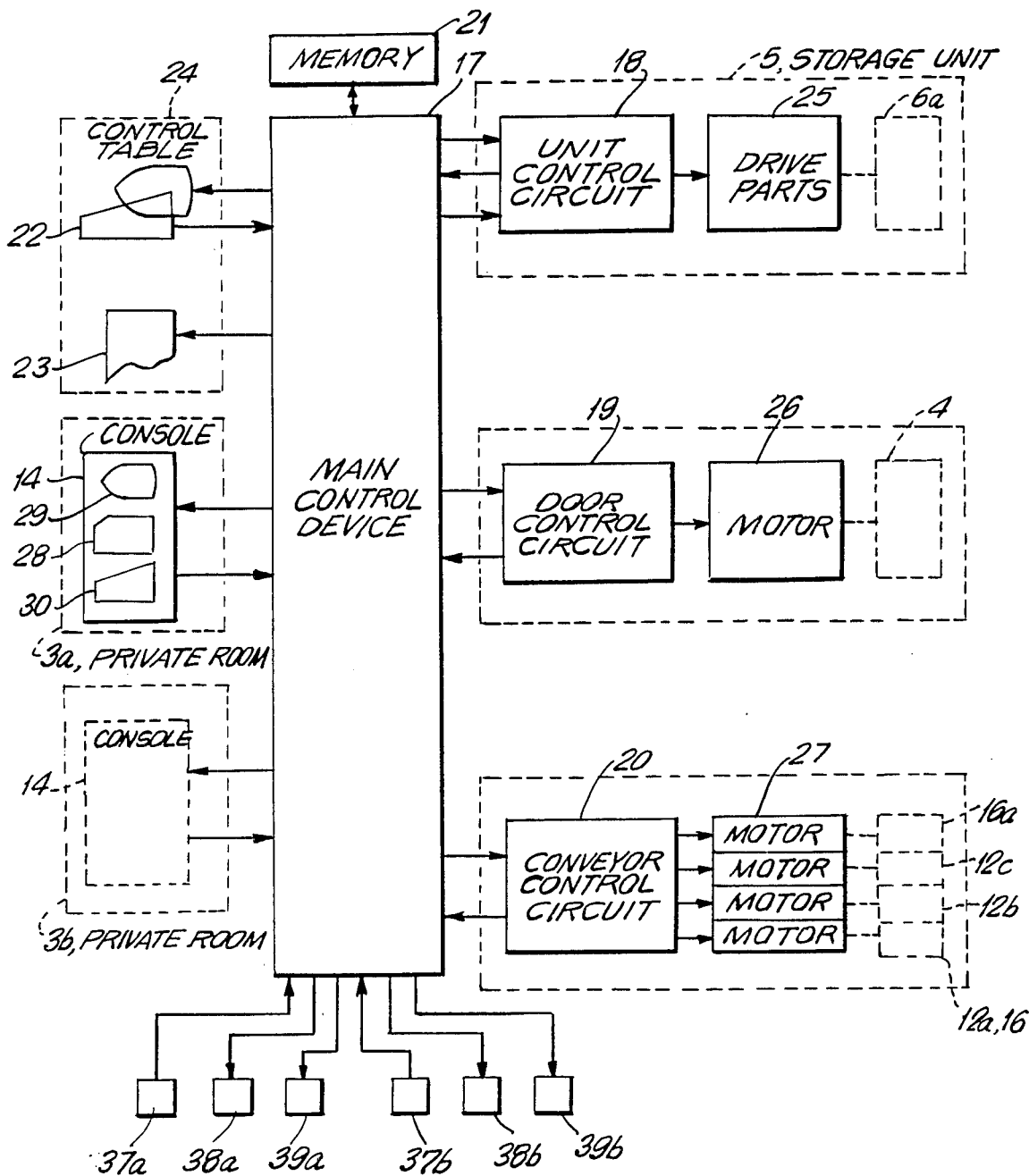
FIG. 3 is a view illustrating a block diagram of a control circuit in the embodiment.

Referring to FIG. 3, in a modification, the storing location codes of boxes are not stored in memory device 21 and main control device 17 is modified to transfer storing location information inputted by keyboard 30 to unit control circuit 18. In the case, a user can obtain boxes as desired by inputting the storing location code of the box as desired after coincidence of the combination inputted by his ID card and the keyboard with the content in the memory device.

Door 4 is usually closed and is opened at each time of the retrieval and storage commands from console 14 by modifying main control device 17 to send the door opening signal to door control circuit 19 in response to each retrieval or storage command from the console, and the door closing signal in response to the transportation complete signal from conveyor control circuit 20.

In cases where it is not required to use either one of the recitation number and the ID card, the other ones of the recitation numbers and the recognition codes of the users are registered in the memory device 21. Then, the user can inputs his code by operating either one of ID card or keyboard.

In order to permit anyone to use the system, the memory device 21 is not necessary but is omitted. The memory device is modified to send information data inputted by keyboard 30 to unit control circuit 18 as a storing location code.

If service input device 24 is not required, it can, of course, be omitted, and the main control device 17 is simplified by omitting the function responding to the service input device 24.

In the embodiments and modifications as described above, two private rooms are provided in the system. However, it will be apparent to those skilled in the art how to make those systems with more or less rooms.

What is claimed is:

1. An automated system for storing and retrieving articles comprising in combination:
    (a) a chamber provided with an opening and door means for sealing said opening;
    (b) a storage unit disposed in said chamber having a plurality of article storage locations arranged in matrix-like form, each of said locations thereby being unique within said system, said storage unit including means for transporting articles between said storage locations and a predetermined position within said chamber;
    (c) at least one article handling table located outside of said chamber;
    (d) motorized means for conveying articles from said predetermined position within said chamber to said article handling table, said conveying means being constructed and arranged to extend through said opening of said chamber thereby having a portion internal to said chamber and a portion external to said chamber, at least one of said portions of said conveying means being movably secured so that said conveying means may be withdrawn from said opening leaving said opening unobstructed whereby said opening is readily sealable by said door means;
    (e) data input terminal means for receiving control information; and
    (f) means for electrically controlling said storage unit, conveying means, and door means in accordance with control information provided to said data input terminal, whereby a preselected article is transported from one of said unique storage locations to said article handling table in response to said control information and said system is fully automated between said storage unit and said article handling table.

2. In a system for storing and retrieving safety deposit boxes from a fire proof safe room provided with an opening, the combination comprising:
    (a) door means for sealing said opening;
    (b) a storage unit disposed in said safe room having a plurality of safety deposit box storage locations arranged in matrix like form for receiving safety deposit boxes, said storage unit including means for transporting safety deposit boxes between said storage locations and a predetermined position within said safe room;
    (c) a plurality of private compartments located outside of said safe room, each of which is provided with data input means for receiving a code corresponding to at least one of said storage locations;
    (d) main conveying means for conveying safety deposit boxes from said predetermined position within said safe room to the exterior of said safe room, said main conveying means being constructed and arranged to extend through said opening of said safe room thereby having a portion internal to said safe room and a portion external to said safe room, at least one of said portions being movably secured so that said main conveying means may be withdrawn from said opening leaving said opening unobstructed and readily sealable;
    (e) a plurality of subsidiary conveying means for transporting safety deposit boxes from said main conveying means to said plurality of private compartments;
    (f) a plurality of transport select means for selecting predetermined safety deposit boxes on said main conveying means and displacing them onto said subsidiary conveying means for transport to a particular private compartment in response to data supplied to said data input means of said private compartment by a user; and
    (g) main control means connected to each of said data input means for electrically controlling said storage unit, main conveying means, door means, subsidiary conveying means, and transport select means in response to data supplied to said data input means, whereby a preselected safety deposit box is transported from one of said storage locations in said safe room to a predetermined private compartment and said system is fully automated between said safe room and said private compartments.

3. The system according to claim 2, wherein said main control means includes a memory and means for comparing an access code supplied by a user with the contents of said memory, said main control means enabling said system for transporting a particular safety deposit box only upon a valid match between said access code and the contents of said memory.

4. The system according to claim 3, wherein said subsidiary conveying means are arranged substantially perpendicular to said main conveying means and each of said transport select means include a stopper plate and a belt conveyer, said belt conveyor and said stopper plate being mounted for vertical translation, said transport select means further comprising detector means for determining the position of a safety deposit box on said main conveying means.

5. The system according to claim 4, wherein said detector means is a photoelectric switch.

6. The system according to claim 4, wherein said detector means includes a microswitch.

* * * * *